No. 788,390. PATENTED APR. 25, 1905.
C. H. BARDENWERPER.
ROTARY MOTOR.
APPLICATION FILED JULY 29, 1904.

6 SHEETS—SHEET 1.

Witnesses.
C. H. Keeney.
Anna F. Schmidtbauer.

Inventor.
Charles H. Bardenwerper.
By Benedict and Morsell,
Attorneys.

No. 788,390. PATENTED APR. 25, 1905.
C. H. BARDENWERPER.
ROTARY MOTOR.
APPLICATION FILED JULY 29, 1904.

6 SHEETS—SHEET 2.

Witnesses.
C. H. Koney,
Anna F. Schmidtbauer.

Inventor.
Charles H. Bardenwerper.
By Benedict and Morsell.
Attorneys.

No. 788,390. PATENTED APR. 25, 1905.
C. H. BARDENWERPER.
ROTARY MOTOR.
APPLICATION FILED JULY 29, 1904.

6 SHEETS—SHEET 3.

Witnesses.
C. H. Koney.
Anna F. Schmidtbauer.

Inventor.
Charles H. Bardenwerper.
By Benedict & Morsell
Attorneys.

No. 788,390. PATENTED APR. 25, 1905.
C. H. BARDENWERPER.
ROTARY MOTOR.
APPLICATION FILED JULY 29, 1904.
6 SHEETS—SHEET 4.
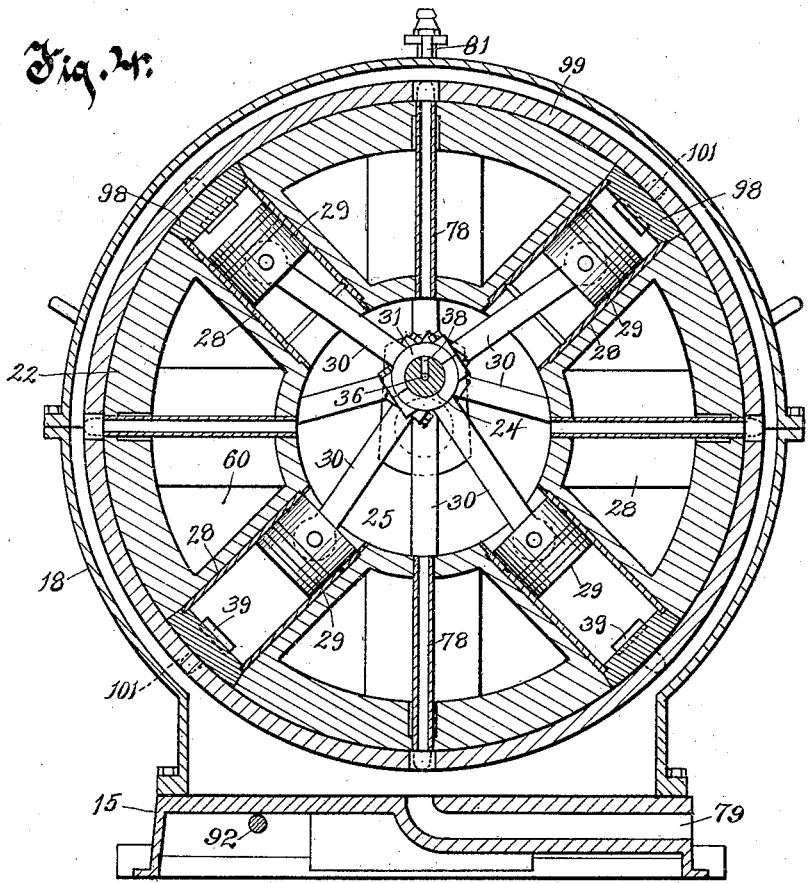
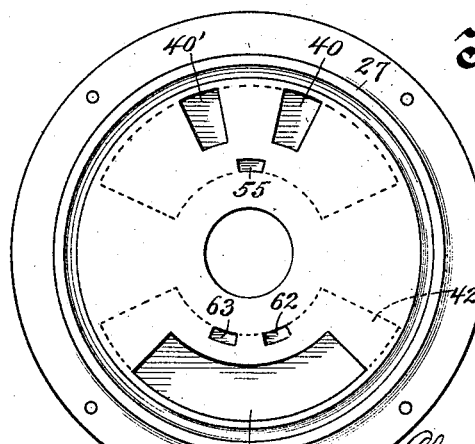
Witnesses.
C. H. Keeney.
Anna F. Schmidthauer.
Inventor.
Charles H. Bardenwerper.
By Benedict & Morsell
Attorneys.

No. 788,390. PATENTED APR. 25, 1905.
C. H. BARDENWERPER.
ROTARY MOTOR.
APPLICATION FILED JULY 28, 1904.

6 SHEETS—SHEET 6.

Witnesses.
C. H. Keeney.
Anna F. Schmidtbauer.

Inventor.
Charles H. Bardenwerper.
By Benedict and Morsell
Attorneys.

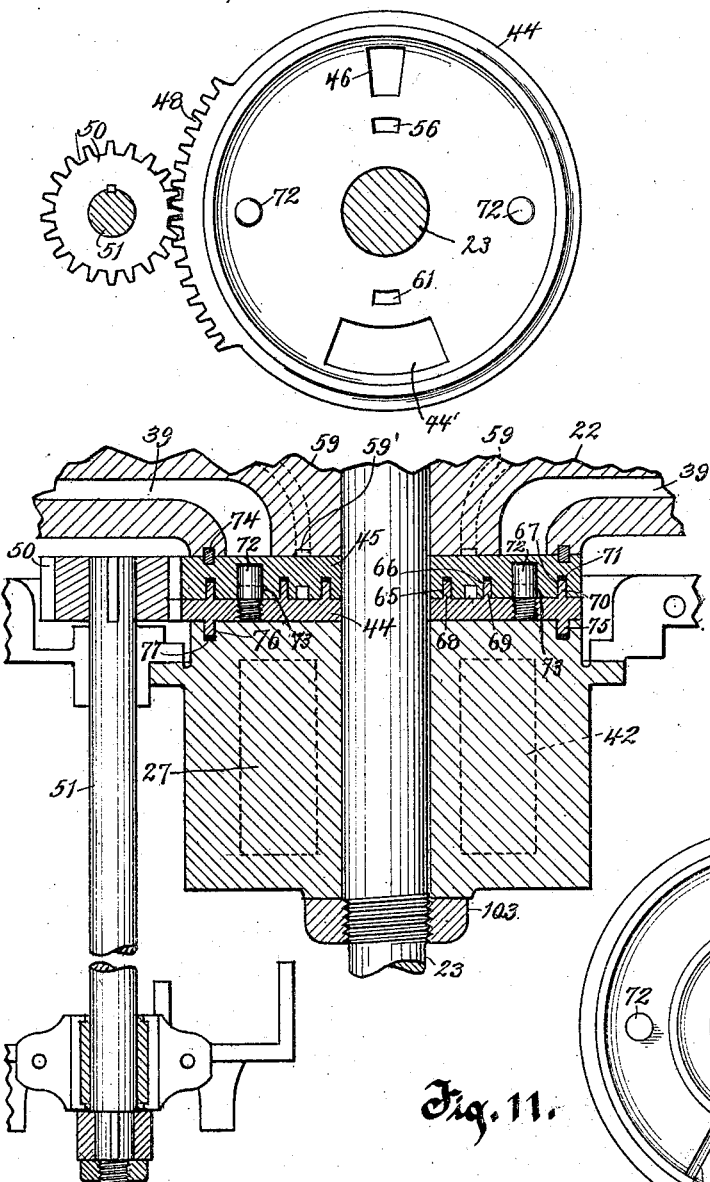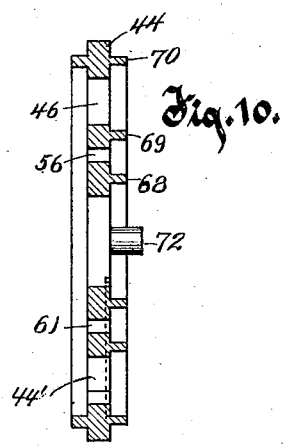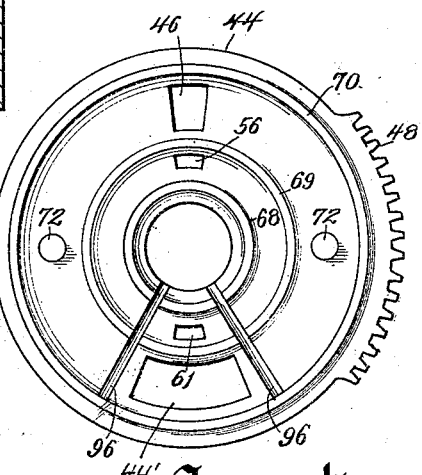

No. 788,390. Patented April 25, 1905.

UNITED STATES PATENT OFFICE.

CHARLES H. BARDENWERPER, OF MILWAUKEE, WISCONSIN, ASSIGNOR TO AMERICAN STEAM MOTOR COMPANY, OF MILWAUKEE, WISCONSIN, A CORPORATION OF WISCONSIN.

ROTARY MOTOR.

SPECIFICATION forming part of Letters Patent No. 788,390, dated April 25, 1905.

Application filed July 29, 1904. Serial No. 218,613.

*To all whom it may concern:*

Be it known that I, CHARLES H. BARDENWERPER, residing in Milwaukee, in the county of Milwaukee and State of Wisconsin, have invented new and useful Improvements in Rotary Motors, of which the following is a description, reference being had to the accompanying drawings, which form a part of this specification.
My invention has relation to improvements in rotary motors.

The primary object of the invention is to provide an improved construction whereby the maximum utilization of the energy of the power medium is secured.

Figure 1:
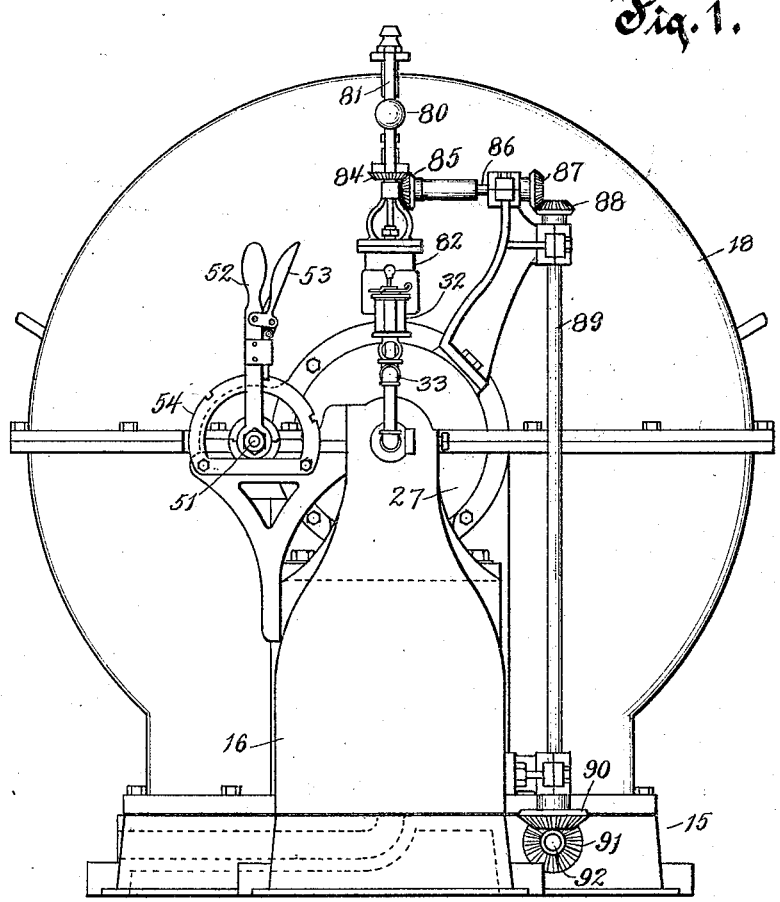
Figure 13:
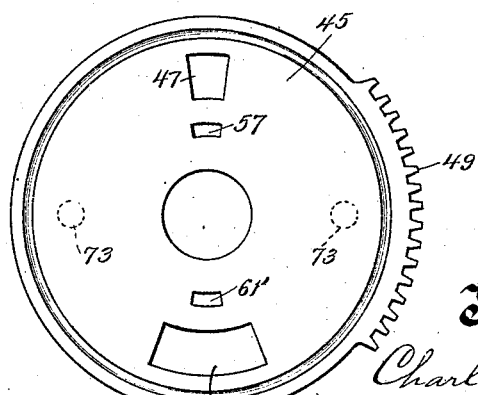
Figure 2:
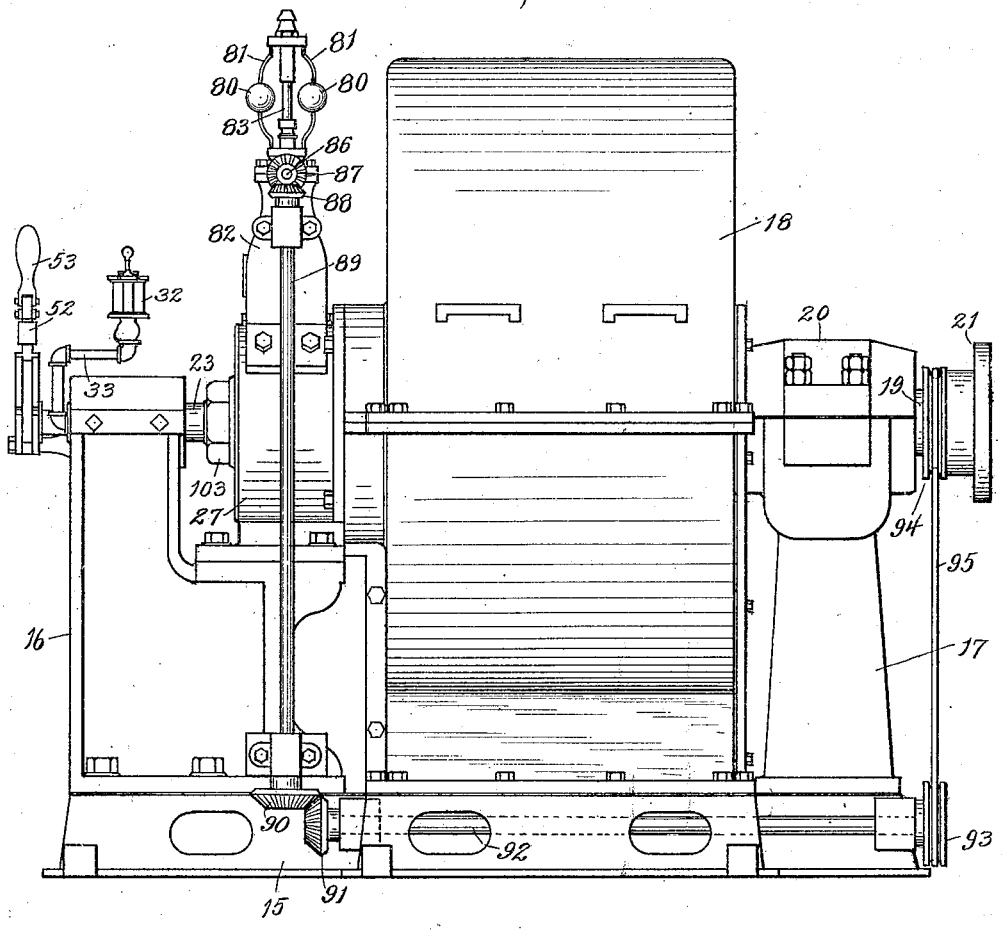
Figure 14:
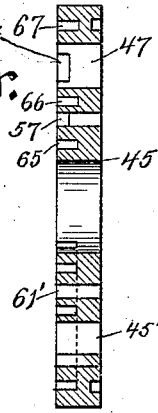
Figure 3:
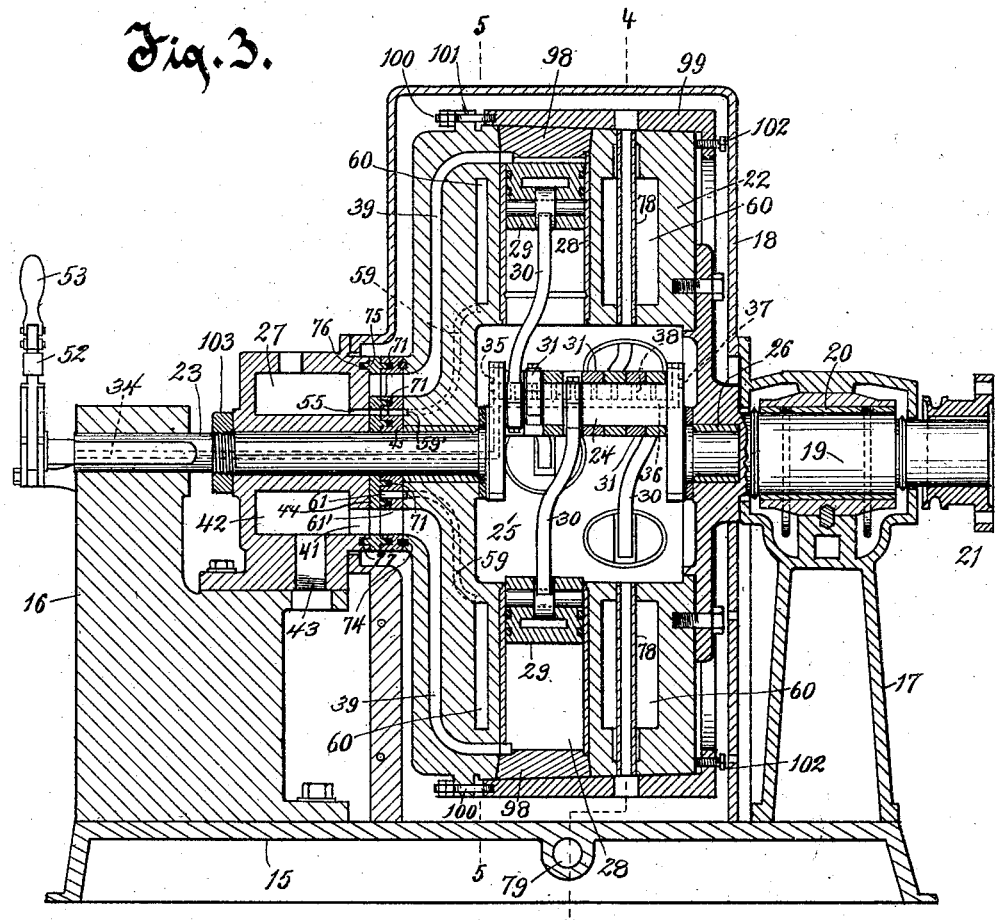
Figure 12:
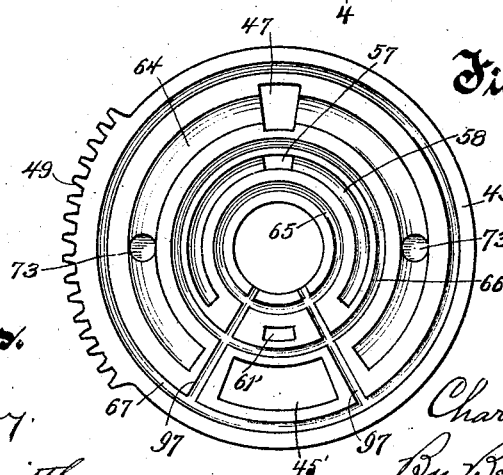
Figure 5:
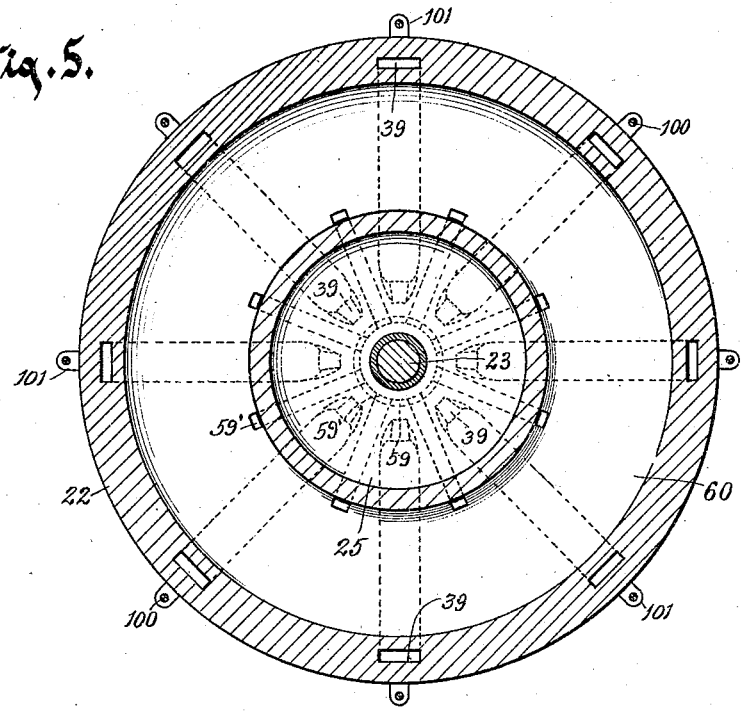
Figure 6:
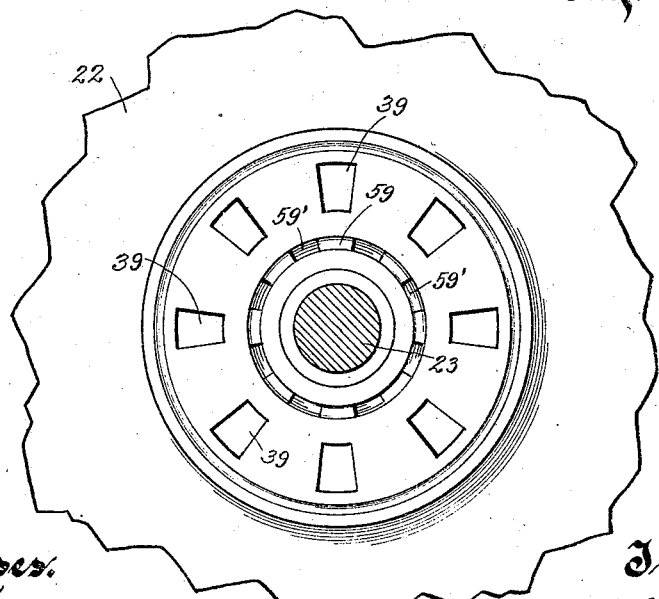

With the above primary object and other incidental objects in view the invention consists of the devices and parts or their equivalents, as hereinafter set forth.
In the accompanying drawings, Figure 1 is an end elevation of the complete device. Fig. 2 is a side elevation. Fig. 3 is a central longitudinal sectional view. Fig. 4 is a cross-section on the line 4 4 of Fig. 3 looking toward the left. Fig. 5 is a cross-section on the line 5 5 of Fig. 3 looking toward the left. Fig. 6 is an enlarged view of the revoluble cylinder-containing member, showing the opposite side to that illustrated in Fig. 5. Fig. 7 is a view looking on the inner face of the casting which contains the steam-chest and the exhaust-chamber. Fig. 8 is an outer face view of the outer section or part of the reversing-valve, showing in connection therewith the pinion for rocking said valve-section. Fig. 9 is a horizontal section centrally through Fig. 8 and adjoining parts not shown in Fig. 8. Fig. 10 is a vertical section through the reversing-valve section illustrated in Fig.
8. Fig. 11 is an inner face view of the section of the reversing-valve shown in Fig. 8. Fig. 12 is an outer face view of the inner section or part of the reversing-valve. Fig. 13 is a view of the inner face of said inner section of the reversing-valve, and Fig. 14 is a central vertical section through Fig. 12 or Fig. 13.

Referring to the drawings, the numeral 15 indicates a base-piece, and this base-piece serves as a support for the different portions of the frame. Extending upwardly from the base-piece are uprights or standards 16 and 17, respectively. Between the uprights and supported by the base-piece is a casing 18 of substantially cylindrical form. Fast to and extending outwardly from one side of the casing is a driven shaft 19, which is journaled in a bearing 20, formed at the upper end of the upright 17. The shaft extends outwardly beyond the bearing and carries on its end a belt-pulley 21, around which a belt (not shown) may pass for conveying the power to machinery to be operated. Within and inclosed by the casing is a revoluble cylinder-carrying member 22, said member adapted to revolve around a stationary shaft or axis 23. This shaft or axis is formed centrally with a crank 24 disposed in a central chamber 25 of the revolving member. The short extension of the shaft 23 from one end of the crank enters a recess 26, formed in the inner face of one side of the revoluble member, and the long extension of the shaft from the opposite end of the crank passes through the casting, in which a steam-chest 27 is formed, and its extremity is fixed in the upper end of the upright 16.

The revolving member has formed therein a series of cylinders 28. The outer ends of these cylinders are closed, while the inner ends thereof open into the central chamber 25 of the revoluble member. Within these cylinders are fitted pistons 29, to each of which is connected a piston-rod 30. Each piston-rod extends through the inner open ends of its cylinder and is connected separately to the wrist or pin of the crank 24. From the fact that the crank-shaft 23 is fixed or non-rotatable the piston-rods and their pistons necessarily do not move inwardly or outwardly. The revoluble cylinder-carrying member 22, however, in its rotation necessarily describes an eccentric movement around the crank 24, and hence instead of the pistons moving in the cylinders, as is usual, the cylinders move on the piston, as will appear most clearly from Figs. 3 and 4 of the drawings. It will be understood, of course, that the connections between the inner ends of the piston-rods and the crank are such that said inner ends of the rods will rotate around the crank, the specific connection being an ordinary form of ring 31 at the inner end of each rod and loosely surrounding the crank. In the accompanying illustration of my invention I have shown the revoluble cylinder-carrying member as provided with eight cylinders, and consequently there are eight pistons and a rod for each of said pistons. The drawings also show separate steam ports or passages leading to each of the cylinders. I wish it understood, however, that I do not restrict myself to the specific number of cylinders and allied parts shown in the accompanying drawings, inasmuch as any number less than eight, so long as at least two are provided, or any number greater than eight may be employed without departing from the spirit and scope of my invention. Of course the greater the number employed the greater will be the power generated.

For the purpose of lubricating the crank-shaft and the connections between said shaft and the inner ends of the piston-rods I provide a lubricating-cup 32, which communicates by way of a pipe 33 with a passage 34, extending through the long straight portion of the shaft 23, said passage communicating at its inner end with a branch passage 35 in one of the webs or arms of the crank 24. The passage 35 in turn communicates with another passage, 36, extending longitudinally of the wrist or pin of the crank, and the latter passage communicates with a final upwardly-extending passage 37 in the other web or arm of the crank. The passages 35 and 37 have small side openings leading therefrom, which permit any overflowing oil to flow to and lubricate the collars on the shaft 23 which are between the webs of the crank and the inner sides of the side walls of the chamber 25. Passage 36 has extending therefrom short ports 38, which lead to the separate circular ring-bearings of the piston-rods. It will be noticed that the oil-cup 32 is sufficiently elevated to cause the oil by the force of gravity to circulate through the several passages referred to.

The revoluble cylinder-carrying member 22 is provided with a series of inlet steam-passages 39. Each of these passages at its inner end is in communication with one of the cylinders near the outer end of the cylinder. The outer ends of the several passages 39 as the revoluble cylinder-carrying member is revolved are adapted to be brought into registration with a port 40 or port 40', extending through the inner wall of the steam-chest. Each of the passages 39 is also adapted to be brought successively into registration with a port 41, leading to an exhaust-chamber 42, preferably formed in the same casting in which the steam-chest 27 is formed. The exhaust-chamber 42 has an exhaust-passage 43 leading therefrom, to which an exhaust-pipe (not shown) may be connected.

If it is desired to use my improved construction as a motor adapted to run only in one direction, then no reversing-valve mechanism is necessary, and in that event the several passages 39 as the member 22 is revolved will be brought successively into registration with, say, the port 40 and thereafter successively into registration with the port 41.

In the operation of the motor when constructed only for running in one direction if it is supposed that one of the passages 39 is in registration with the port 40 and steam is admitted into the steam-chest 27 the said steam will pass through port 40, thence through the passage 39 into the cylinder with which this particular passage 39 communicates. In view of the fact that the pistons in the cylinders are fixed against movement in or out the expansive force of the steam admitted to the particular cylinder referred to will force the revoluble member 22 around, and as the several passages 39 are thereby successively brought into registration with the port 40 these passages will likewise permit steam to pass to their respective cylinders. As the passage 39 leading to the cylinder which was first to take steam comes into registration with the exhaust-port 41 the steam in said cylinder will exhaust through passage 39, leading from said cylinder, through port 41 and into exhaust-chamber 42, and thence out of said exhaust-chamber through the exhaust-passage 43.

As heretofore stated, the revoluble member 22 is eccentrically disposed with reference to the crank 24, and as the pistons are held immovable by reason of the piston-rods thereof connecting with the fixed crank the distance of the periphery of the revoluble member from the crank 24 gradually increases from the point where each cylinder takes its steam to the point where each cylinder exhausts its steam, the point of exhausting occurring after each cylinder has completed approximately a half-revolution, the distance of the periphery of the revoluble member from the crank being the greatest at the completion of said half-revolution. In the remaining half-revolution of a cylinder, however, the distance of the periphery of the revoluble member at the point where said cylinder is located from the crank gradually decreases. During the first half movement referred to the steam in each of the cylinders is acting expansively, and this expansive action becomes greater and greater as each cylinder approaches the completion of its half-revolution or, in other words, as each cylinder approaches its lowest position. Of course as the distance of the periphery of the revoluble member from the crank increases each cylinder moves outwardly a gradually-increasing distance on its fixed or immovable piston, and consequently when a cylinder reaches its lowermost position its outward position with reference to its piston is the greatest. At this point the steam-passage relating to the lowermost cylinder comes into registration with the exhaust-port 41, and the steam is exhausted from this particular cylinder. This exhaust continues until the passage 39 passes the exhaust-port 41. After passage 39 of each cylinder leaves exhaust-port 41 the particular cylinder relating thereto is inactive until it again comes into registration with the inlet-port 40.

In the construction of my improved motor it is preferred that provision be made for reversing the direction of rotation of the revoluble member 22. For this purpose a reversing-valve is interposed between the inner side of the casting of the steam-chest 27 and that portion of the outer face of the revoluble member 22 through which the passages 39 lead. This valve is preferably composed of two parts—viz., an outer section 44 and an inner section 45. The outer section is provided near the upper portion of its peripheral edge with a port or opening 46, and the inner section is provided with a correspondingly-located port or opening 47. The ports 46 and 47 of these two sections of the reversing-valve are in register and are adapted to be brought into registration with the port 40, leading to the steam-chest, when it is desired to have the motor run in one direction or into registration with the port 40' when it is desired to have the motor run in the opposite direction. For conveniently turning the two sections of the reversing-valve together in either direction, so as to bring their ports 46 and 47 into registration with the port 40 or into registration with the port 40', I provide teeth 48 partly around the periphery of the outer section 44 and teeth 49 partly around a corresponding portion of the periphery of the inner section 45. These teeth are engaged by a pinion 50, carried on the inner end of a rock-shaft 51. On the outer end of the rock-shaft is a hand-lever 52, and this hand-lever carries a spring-actuated dog 53, which works over a notched segment 54. When the dog is in engagement with the central notch of the segment, the registering ports 46 and 47 are not in registration with either the port 40 or 40', and consequently the motor is at a standstill. When the dog is released from the central notch and the lever swung either to the right or left and the dog permitted to engage either of the end notches, the registering ports 46 and 47 are brought into registration with either of the ports 40 or 40', in accordance with the direction of turning of the lever. The outer section 44 of the reversing-valve is also provided with an exhaust-port 44' and the inner section with a corresponding registering exhaust-port 45'. The two sections of the reversing-valve are loosely fitted between the inner face of the casting forming the steam-chest and the opposed face of the revoluble member 22, so as not only to provide for the sections being rotated together either to the right or to the left, but also to provide for their having a slight play away from each other when steam is admitted between the opposed faces thereof. Steam is admitted into the space between said opposed faces through a small port 55 in the inner wall of the steam-chest, which is adapted when the motor is not running and the dog 53 of the lever 52 is in engagement with the central notch of the segment 54 to register with similar registering small ports 56 and 57 in the respective sections of the reversing-valve. The port 57 of the inner section of the reversing-valve intersects the path of a segmental recess 58, formed in the outer face of said inner section of the reversing-valve. The steam which passes through these registering ports therefore enters the recess 58 and expanding in said recess spreads the two sections of the reversing-valve apart, and hence causes said sections, respectively, to bear firmly against the inner wall of the steam-chest casing and against the face of the revoluble member 22, and hence assist in effecting a steam-tight joint. The steam which passes through the port 55 and the small registering ports 56 and 57 not only enters the recess 58 and acts to spread the two sections of the reversing-valve apart, but it is also adapted to pass through the port 57 and enter an annular recess 59' and from said recess is adapted to flow into the series of passages 59 in the revoluble member 22. The inner ends of these several passages 59 are in communication with the hollow communicating chambers or spaces 60 of the revoluble member 22. It follows that when the motor is at a standstill and the steam is allowed to enter the steam-chest the said steam will act to spread the two sections of the reversing-valve apart and will also pass by way of the passages 59 into the hollow space 60 of the revoluble member 22 and will thereby serve to keep said revoluble member in a heated condition. When the motor is started, the position of the reversing-valve is shifted, so that the registering ports 56 and 57 are no longer in registration with the port 55. The rotatably-shifted position of the two sections of the reversing-valve, however, brings two lower registering small ports 61 61' of the respective sections of the valve into registration with either one of two small lower ports 62 and 63, which open into the exhaust-chamber 42 in accordance with the direction of the running of the motor. In this case steam is supplied to the hollow communicating chambers 60 of the revoluble member 22 from the exhaust-chamber 42 through either port 62 or through port 63, in accordance with the direction of the running of the motor, and into the annular recess 59' and through the passages 59 to the hollow spaces 60. In view of the fact that when the motor is started the ports 55 and 56 57 are no longer in registration of course steam is no longer admitted into the segmental recess 58 and other provision must be made during the running of the motor for holding the two sections of the reversing-valve spread apart. This is provided for by having the upper port 47 of the inner section of the reversing-valve intersect a segmental passage 64 in the inner face of said valve. In this manner steam is also supplied to the space between the opposing faces of the sections of the reversing-valve during the time the motor is running.

In order to form an effectual steam-tight joint between the two sections of the reversing-valve, I provide the outer face of the inner section 45 with a plurality of annular recesses, three being shown in the accompanying drawings and designated, respectively, 65, 66, and 67. These recesses are adapted to receive annular ribs 68, 69, and 70, formed on the inner face of the outer section 44 of said valve. The ribs do not completely fill up the recesses, and suitable packings 71 are interposed between the inner ends of said ribs and the bottoms of the recesses. Of course any desired number of the recesses referred to and the coöperating ribs may be provided, and, if desired, the arrangement may be reversed—that is to say, the recesses may be provided on the inner face of the section 44 and the ribs on the outer face of the section 45.

In order to securely hold the two sections of the reversing-valve to rotation together, I provide pins 72 72, screwed into the outer section 44 and entering recesses 73 73 therefor in the inner section. A packing is also advisably applied between the inner face of the inner section 45 of the reversing-valve and the opposed face of the revoluble member 22, said packing consisting of an annulus or ring 74 of suitable material and seated in registering recesses in the two parts referred to. A steam-tight joint is also advisably provided between the outer face of the outer section 44 of the valve and the inner face of the casting forming the steam-chest, said joint being formed by an annular rib 75, fitting in an annular recess 76 in said inner face of the casting forming the steam-chest. The rib 75 does not completely fill up the recess 76, and the space between the outer edge of said rib and the bottom of the recess is filled by a packing 77.

The reversing-valve instead of being formed in two sections, as shown and as hereinbefore described, could of course be in one piece; but in that event no provision for introducing steam between two sections for the purpose of forcing said sections apart and in contact with the surfaces to which they are opposed would be present, and hence a two-part reversing-valve is preferred. When, however, the valve is made in one piece, the ports 46 and 47 would be a single port, likewise the ports 56 57, 44' 45', and 61 61'.

For the purpose of conducting from the central chamber 25 of the revoluble member 22 oil or other matter which may accumulate in said chamber I provide passages or tubes 78 78, leading from the said chamber to the space of the casing 18, which surrounds the revoluble member 22. This space is provided with a drain 79, from which such oil may be finally discharged.

For the purpose of regulating the speed of the revoluble member 22 I provide governor mechanism consisting of the usual governor-balls 80 80, which are adapted when the speed of revolution of the revoluble member 22 increases to fly outwardly by centrifugal force, and thereby operate through links 81 81 on the valve (not shown and which is located in the valve-casing 82) in order to partly or wholly close said valve in accordance with the speed of rotation of the revoluble member 22. For the purpose of rotating the shaft 83, carrying the brackets which support the links 81, I provide said shaft with a beveled pinion 84, which is in mesh with a beveled pinion 85 on the end of a short shaft 86. On the outer end of this short shaft is another beveled pinion 87, which is in mesh with a beveled pinion 88 at the upper end of an upright shaft 89. The lower end of upright shaft 89 carries a beveled gear 90, which is in mesh with a beveled gear 91 at one end of a horizontal shaft 92. The opposite end of shaft 92 carries a belt-pulley 93, which is belted up to a similar pulley 94 on the driven shaft 19 by a belt 95.

The section 44 of the reversing-valve is provided with diagonal ribs 96 96, which when the opposed faces of the two sections of the valve are fitted together are adapted to enter diagonal grooves 97 97 in the valve-section 45. This provision prevents the steam which enters the recesses 58 and 64 from escaping and passing to the exhaust.

It is important that the closed ends or heads of the several cylinders 28 should extend a desired distance into the cylinders, so as to make the compression-space of said cylinders as small as possible. I show in the accompanying drawings heads extending a desired distance into the cylinders and designated by the numerals 98. As a convenient means for forcing the heads into the ends of the cylinders and for retaining the same therein I provide an annulus or ring 99, which surrounds the heads and has its inner surface tapered or beveled and adapted to act against the oppositely tapered or beveled outer surfaces of the heads. This wedge-ring is drawn into tight engagement with the beveled surfaces of the heads by means of screws 100, which pass through lugs 101, extending from the revoluble member 22, the inner threaded ends of said screws engaging the wedge-ring. When the screws are turned in one direction, they will have the effect of drawing the wedge-ring into tight engagement with the beveled surfaces of the heads, and when said screws are turned in the opposite direction the wedge-ring is of course loosened. Other screws, 102, are turned through a side flange of the wedge-ring, and their inner ends contact with the revoluble member. This wedge-ring serves, further, as a means for tightening up at any time the joint between it and the heads of the cylinder, and this necessity for tightening frequently arises, owing to the expansion of the metal by heat.

While I have hereinbefore described steam as the actuating medium for the motor, yet I do not wish to be understood as limiting myself thereto, inasmuch as the machine may be operated by any desirable actuating fluid and air may be used to good advantage.

The motor may also be used as an air-compressor without changing the construction; but in that event the driven shaft 19 would be the driving-shaft and would be rotated from any suitable source of power by a belt passing around the pulley 21. Under this application of the invention the revoluble member 22 will act to suck in air through the inlet and through the passages 39 and discharge said air through the exhaust, the same as in the case of steam.

The long straight portion of the shaft 23 is threaded for a short distance, and on these threads works a nut 103. Whenever there is any wear on the faces of the valve-sections or on the bearing inner face of the wall of the steam-chest or on the face of the revoluble member which bears against the inner face of the inner valve-section, this wear can be compensated for by turning the nut in the proper direction to draw the shaft outwardly.

What I claim as my invention is—

1. In a rotary motor, the combination of a frame, a revoluble member provided with a hollow space and with a port leading to said space, means for supplying a heating agent to the port, the said port being in communication with the source of heating-agent supply when the motor is at a standstill, means for supplying an actuating fluid to the revoluble member, means, when said actuating fluid is supplied to the revoluble member, for throwing the port leading to the hollow space out of registration with the source of heating-agent supply, and means for exhausting the heating agent and for exhausting the actuating fluid.

2. In a rotary motor, the combination of a frame, a movable member, a two-part valve disposed between the movable member and the framework, the space between the inner opposed faces of the sections of the valve being adapted to be placed into communication with the source of actuating-fluid supply, whereby the two sections of the valve are adapted, upon the admission of the actuating fluid therebetween, to be spread apart and against the framework and the movable member, respectively, the two sections of said valve provided with registering inlet-ports for supplying the movable member, means for shifting the valve so as to cut the same into or out of communication with the source of actuating-fluid supply, and means for exhausting the actuating fluid from the movable member.

3. In a rotary motor, the combination of a frame, a movable member, a two-part valve disposed between the movable member and the framework, the sections of said valve provided with registering ports adapted to be brought into or out of registration with the source of actuating-fluid supply, the port of one of the sections communicating with a passage in the face of said section which is opposed to the face of the other section, whereby, when the registering ports of said valve-sections are brought into registration with the source of actuating fluid, the said fluid is admitted between the opposed faces of the valve-sections and into the passage of one of the sections, and said sections thereby spread apart and against the framework and the movable member, respectively, means for controlling the valve for admitting the actuating fluid to the movable member, or for cutting out the supply of the actuating fluid to said movable member, and means for exhausting the actuating fluid from the movable member.

4. In a rotary motor, the combination of a frame, a movable member, a two-part valve disposed between the movable member and the framework, the sections of said valve provided with registering inlet-ports adapted to be brought into or out of registration with the source of actuating-fluid supply and when brought into registration, to supply said actuating fluid to the movable member, and the inlet-port of one of the sections communicating with the passage in the face of said section which is opposed to the face of the other section, whereby, when the registering ports of said valve-sections are brought into registration with the source of actuating-fluid supply, the said fluid is permitted to pass to the movable member, and is also admitted between the opposed faces of the valve-sections and into the passage of one of said sections, and said sections thereby spread apart and against the frame and the movable member, respectively, means for operating the valve-sections so as to bring the inlet-ports thereof into or out of registration with the source of actuating-fluid supply, and means for exhausting the actuating fluid from the movable member.

5. In a rotary motor, the combination of a frame, a movable member, an actuating-fluid chest formed in the framework and in communication with the source of actuating-fluid supply, and provided with a port leading therefrom, a two-part valve disposed between the movable member and the inner wall of said chest, the sections of said valve provided with registering ports adapted to be brought into or out of registration with the port of the fluid-chest, the port of one of these sections of the valve communicating with a passage in the face of said section which is opposed to the face of the other section, whereby, when the registering ports of said valve-sections are brought into registration with the port of the fluid-chest, the actuating fluid is admitted between the opposed faces of the valve-sections and into the passage of one of said sections, and said sections thereby spread apart and against the framework and the movable member, respectively, means controlled by the valve for admitting the actuating fluid to the movable member, or for cutting out the supply of the actuating fluid to said movable member, and means for exhausting the actuating fluid from the movable member.

6. In a rotary motor, the combination of a frame, a movable member, an actuating-fluid chest formed in the framework and in communication with the source of actuating-fluid supply, and provided with a port leading therefrom, a two-part valve disposed between the movable member and the inner wall of the fluid-chest, the sections of said valve provided with registering inlet-ports adapted to be brought into or out of registration with the port leading from the fluid-chest, the inlet-port of one of said sections of the valve communicating with a passage in the face of said section which is opposed to the face of the other section, whereby, when the registering inlet-ports of said valve-sections are brought into registration with the port of the chest, the actuating fluid is permitted to pass to the movable member and is also admitted between the opposed faces of the valve-sections and into the passage of one of said sections, and said sections thereby spread apart and against the framework and the movable member, respectively, means for operating the valve-sections so as to bring the inlet-ports thereof into or out of registration with the port of the actuating-fluid chest, and means for exhausting the actuating fluid from the movable member.

7. In a rotary motor, the combination of a frame, a revoluble member provided with a plurality of passages for the actuating fluid, an actuating-fluid chest formed in the framework and provided with a port through one wall thereof, an exhaust-chamber formed in the framework and having a port through one wall thereof, a two-part valve disposed between the revoluble member and the portion of the framework in which the fluid-chest and the exhaust-chamber are located, the space between the inner faces of said sections of the valve being in communication with the source of actuating-fluid supply, whereby the two sections of the valve are adapted, upon the admission of the actuating fluid therebetween, to be spread apart and against the framework and movable member, respectively, the two sections of said valve provided with registering inlet-ports adapted to be brought into registration with the port of the fluid-chest, and also provided with registering ports adapted to be brought into registration with the port leading to the exhaust-chamber, the several passages of the revoluble member being successively brought into registration with the registering inlet-openings of the two sections of the valve, when said valve is adjusted so as to bring either set of its inlet and exhaust ports into registration with the source of actuating-fluid supply and exhaust, and thereafter successively into registration with the exhaust-port leading to the exhaust-chamber, and means for shifting the valve so as to cut the registering inlet-ports thereof into or out of communication with the inlet-port of the fluid-chest.

8. In a rotary motor, the combination of a frame, a movable member, an actuating-fluid chest formed in the framework and in communication with the source of actuating-fluid supply, and provided in one wall with two ports, one of said ports adapted for supplying the actuating fluid to the revoluble member, a two-part valve disposed between the revoluble member and the portion of the framework in which the fluid-chest is located, the two sections of said valve provided with registering inlet-ports adapted to be brought into registration with the port of the fluid-chest which is adapted for supplying the fluid to the revoluble member, and means for shifting the valve-sections together, the said sections when in a position to cut off registration between the registering inlet-ports thereof and one of the ports of the fluid-chest, adapted to have the space between the opposed faces thereof brought into communication with the other port of the fluid-chest, whereby the fluid is admitted between said faces of the sections of the valve to thereby spread said sections apart and against the framework and movable member, respectively, and when shifted to a position to bring their registering inlet-openings into registration with the corresponding port of the fluid-chest, adapted to bring the space between the opposed faces of the sections of the valve into communication with the inlet fluid-supply, and to also permit said fluid to pass to the movable member, and means for exhausting the fluid from the movable member.

9. In a rotary motor, the combination of a frame, a movable member provided with a hollow space, and with a passage leading to said hollow space, a two-part valve disposed between the movable member and the framework, the space between the opposed inner faces of the sections of the valve being in communication with the source of actuating-fluid supply, whereby the sections are adapted, upon the admission of the actuating fluid therebetween, to be spread apart and against the framework and movable member, respectively, and the inner section of the valve provided with a port therethrough which is adapted to permit the actuating fluid to pass from between the opposed faces of the valve-sections and into the passage of the movable member which leads to the hollow communicating space of said movable member, and the two sections of the valve provided with registering inlet-ports for supplying the movable member, means for shifting the valve-sections together so as to cut the registered inlet-ports thereof into or out of communication with the source of actuating-fluid supply, and means for exhausting the actuating fluid from the movable member.

10. In a rotary motor, the combination of a frame, an exhaust-chamber in the framework and provided with a port through its inner wall, a movable member provided with a hollow space and with a passage leading to said space, a two-part valve disposed between the movable member and the framework, the space between the opposed inner faces of the sections of the valve being adapted to be placed into communication with the source of actuating-fluid supply when the motor is at a standstill, whereby the sections of the valve are adapted, upon the admission of the actuating fluid therebetween, to be spread apart and against the framework and movable member, respectively, and the inner section of the valve provided with a port therethrough which is adapted to permit the actuating fluid to pass from between the opposed faces of the valve-sections and into the passage of the movable member which leads to the hollow communicating space of said movable member, whereby when the motor is at a standstill the hollow space is heated by the inflowing actuating agent, and the two sections of the valve also provided with other registering ports adapted to be brought into registration with the passage of the movable member which leads to the hollow communicating space when the valve is shifted to such position as to provide for the running of the motor, and also to be brought into communication with the port leading to the exhaust-chamber, whereby during the running of the motor the said hollow space is heated by the exhausting fluid, and said sections of the valve further provided with registering inlet-ports for supplying the movable member, when the valve is shifted to admit the actuating fluid through the inlet-openings of the valve-sections, and means for shifting the valve-sections so as to cut the inlet-ports thereof into or out of communication with the source of fluid-supply.

11. In a rotary motor, the combination of a frame, a movable member, a two-part valve disposed between the movable member and the framework, the space between the inner opposed faces of the sections of the valve being adapted to be placed into communication with the source of actuating-fluid supply, whereby the two sections are adapted, upon the admission of the actuating fluid therebetween, to be spread apart and against the framework and the movable member, respectively, the two sections of the valve provided with registering inlet-ports for supplying the actuating fluid to the movable member, and one section also provided with one or more annular recesses and the other with one or more annular ribs adapted to fit the recesses of the opposed face of the first-referred-to member, means for shifting the valve-sections together so as to cut the registering inlet-ports thereof into or out of communication with the source of actuating-fluid supply, and means for exhausting the actuating fluid from the movable member.

12. In a rotary motor, the combination of a frame, a movable member, a two-part valve disposed between the movable member and the framework, the space between the inner opposed faces of the sections of the valve being adapted to be placed into communication with the source of actuating-fluid supply, whereby the two sections are adapted, upon the admission of the actuating fluid therebetween, to be forced apart and against the framework and the movable member, respectively, the two sections of the valve provided with registering inlet-ports for supplying the actuating fluid to the movable member, and one section also provided with one or more annular recesses and the other with one or more annular ribs adapted to fit the recesses in the opposed faces of the first-referred-to members, packing between the inner ends of the ribs and the bottoms of the recesses, means for shifting the valve-sections together so as to cut the registering inlet-ports thereof into or out of communication with the source of actuating-fluid supply, and means for exhausting the actuating fluid from the movable member.

13. In a rotary motor, the combination of a frame, a movable member, a two-part valve disposed between the movable member and the framework, the space between the inner opposed faces of the sections of the valve being adapted to be placed into communication with the source of actuating-fluid supply whereby the two sections are adapted, upon the admission of the actuating fluid therebetween, to be forced apart and against the framework and the movable member, respectively, the two sections of the valve provided with registering inlet-ports for supplying the actuating fluid to the movable member, a packing between the outer face of the outer section of the valve and the framework, and a packing between the inner face of the inner section of the valve and the movable member, means for shifting the valve-sections together so as to cut the registering inlet-ports thereof into or out of communication with the source of actuating-fluid supply, and means for exhausting the actuating fluid from the movable member.

14. In a rotary motor, the combination of a frame, a movable member, a two-part valve disposed between the movable member and the framework and provided with registering discharge-ports adapted when the valve is shifted to one position to permit the steam which is supplied to the movable member to pass through said registering discharge-ports to the source of discharge, the face of one of the sections of the valve which is opposed to the face of the other section being provided with a recess which is adapted to be placed into communication with the source of fluid-supply whereby the two sections are adapted, upon the admission of the actuating fluid to said recess, to be spread apart and against the framework and the movable member, respectively, and said recessed section of the valve also provided with radial recesses extending across the first-referred-to recesses and between which the registering discharge-ports of the valve-sections lie, and the other section of the valve provided with radial ribs fitting said recesses, and both sections of the valve provided with registering inlet-ports for supplying the actuating fluid to the movable member, and means for shifting the valve-sections together so as to cut the registering inlet-ports thereof into and out of communication with the source of actuating-fluid supply.

15. In a rotary motor, the combination of a frame, a revoluble member provided with a central chamber, a shaft upon which the revoluble member is mounted, said shaft having an oil-passage extending longitudinally thereof and opening into the central chamber of the revoluble member for the purpose of lubricating parts of the mechanism, and one or more conduits leading from the central chamber, and through the revoluble member and adapted to discharge the oil which may accumulate in said central chamber.

16. The combination of a revoluble member provided with a series of cylinders and with passages leading to said cylinders for the purpose of supplying an actuating fluid thereto, pistons in the cylinders, heads fitted to the outer ends of the cylinders and extending a desired distance into said cylinders, the outer surfaces of the heads being tapered or beveled, an annulus or ring surrounding the revoluble member and having its inner surface bearing against the outer surfaces of the heads of the cylinder, and tapered oppositely thereto, and means for drawing the ring into or out of tight wedging engagement with the heads of the cylinders.

17. In a rotary motor, the combination of a frame, a revoluble member provided with an inlet for a heated actuating fluid, and with an exhaust for said fluid, the said inlet when in registration with the source of actuating-fluid supply adapted to conduct the actuating fluid to and actuate the revoluble member and said revoluble member further provided with a hollow space and with a port leading to said space, the said port being in registration with the source of actuating-fluid supply when the motor is at a standstill, whereby the revoluble member is heated during the period of inactivity of the motor, and said port being out of registration with the source of actuating-fluid supply, but in communication with the exhausting actuating fluid, when the motor is running, whereby during the period of running of the motor the hollow space is heated by the exhausting actuating fluid.

In testimony whereof I affix my signature in presence of two witnesses.

CHARLES H. BARDENWERPER.

Witnesses:
  A. L. MORSELL,
  C. S. MATTESON.